United States Patent [19]

Yang

[11] Patent Number: 5,780,950
[45] Date of Patent: Jul. 14, 1998

[54] CO-AXIAL MAGNETIC CIRCUIT TYPE COMPOUND ROTOR ELECTRICAL MACHINE

[76] Inventor: Tai-Her Yang, No. 32 Lane 29, Taipin St., Si-Hu Town, Dzan-Hwa, Taiwan

[21] Appl. No.: 855,594

[22] Filed: May 13, 1997

Related U.S. Application Data

[63] Continuation of Ser. No. 324,664, Oct. 18, 1994, abandoned.

[51] Int. Cl.⁶ .......................... H02K 17/34; H02K 47/04; H02K 7/20
[52] U.S. Cl. ............................ 310/114; 310/112; 310/113
[58] Field of Search .................................. 310/112, 113, 310/114, 152, 154

[56] References Cited

U.S. PATENT DOCUMENTS

| | | | |
|---|---|---|---|
| 1,874,094 | 8/1932 | Ford et al. | 310/112 |
| 2,717,969 | 9/1955 | Buchhold et al. | 310/112 |
| 3,360,667 | 12/1967 | Gordon, Jr. | 310/154 |
| 3,374,376 | 3/1968 | Kromrey | 310/112 |
| 3,471,729 | 10/1969 | Latta et al. | 310/114 |
| 3,651,355 | 3/1972 | Mason | 310/112 |
| 3,717,780 | 2/1973 | Hohne, Jr. et al. | 310/112 |
| 3,723,796 | 3/1973 | Mason | 310/257 |
| 4,221,984 | 9/1980 | Mason | 310/112 |
| 4,358,693 | 11/1982 | Palmer | 310/112 |
| 4,577,129 | 3/1986 | Bertram | 310/112 |
| 4,883,996 | 11/1989 | Aoki | 310/154 |
| 5,212,418 | 5/1993 | Mason | 310/114 |
| 5,258,677 | 11/1993 | Mason | 310/114 |
| 5,283,492 | 2/1994 | Mason | 310/114 |

FOREIGN PATENT DOCUMENTS

| | | | |
|---|---|---|---|
| 948257 | 5/1974 | Canada | 310/112 |
| 2740117 | 3/1978 | Germany | 310/114 |
| 57-170053 | 10/1982 | Japan | 310/114 |

*Primary Examiner*—Clayton E. LaBalle
*Attorney, Agent, or Firm*—Bacon & Thomas

[57] ABSTRACT

A compound rotor electrical machine includes two or more electrical machines, in the form of motors and/or generators in which magnetic flux paths between magnetic poles of the electrical machines pass in series through the rotors of the machines to form a single flux path which includes the separate rotors.

27 Claims, 14 Drawing Sheets

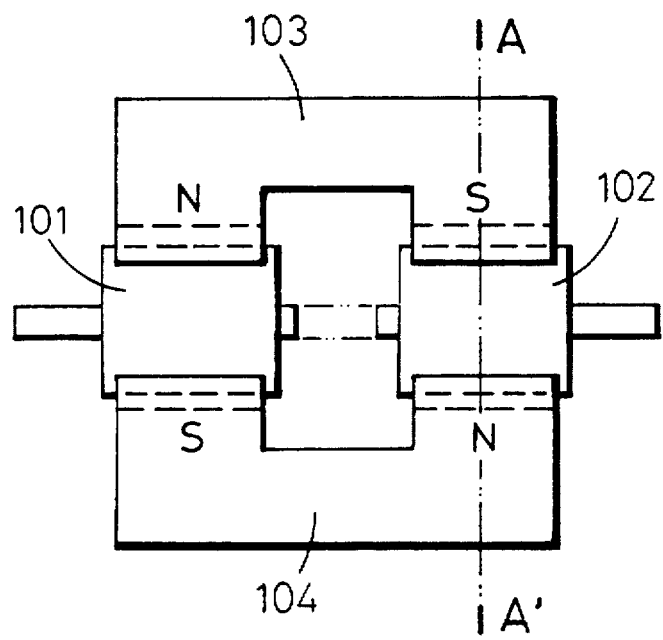
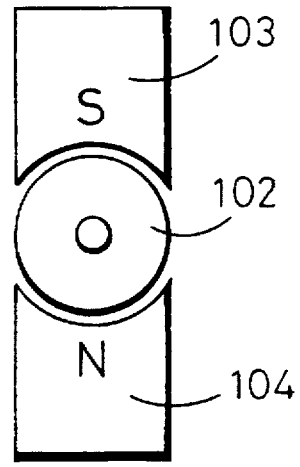
FIG. 1  FIG. 2
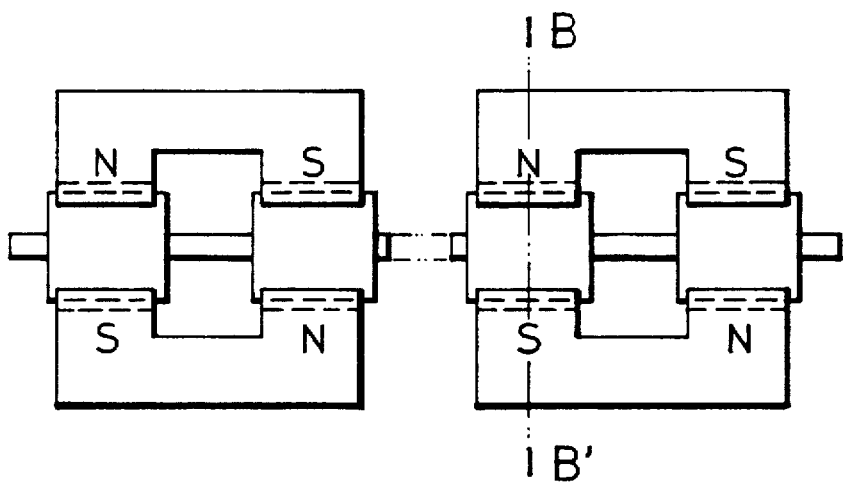
FIG. 3  FIG. 4

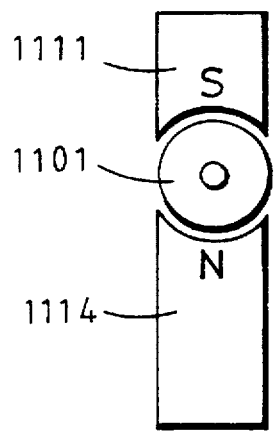
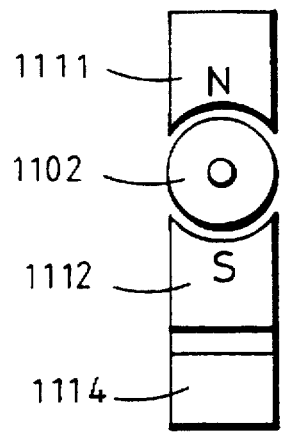
FIG. 12  FIG. 13
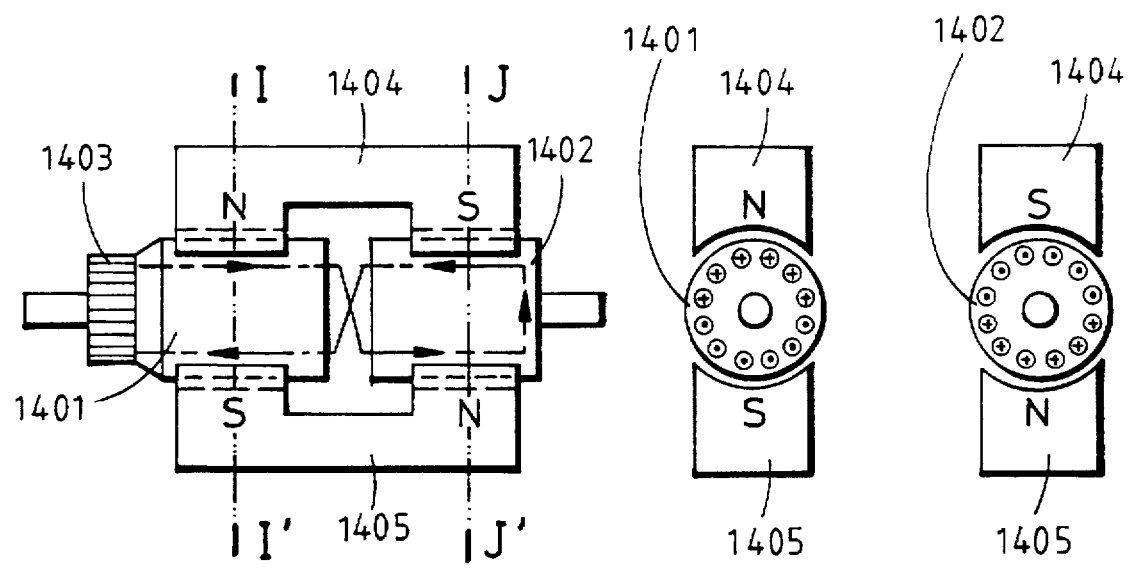
FIG. 14  FIG.15  FIG.16

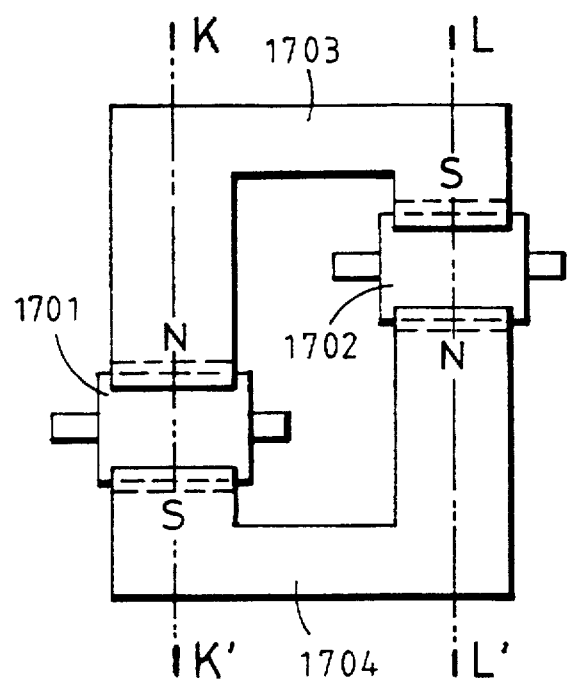
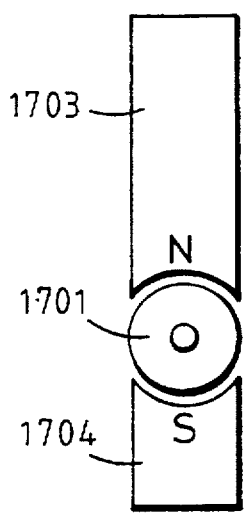
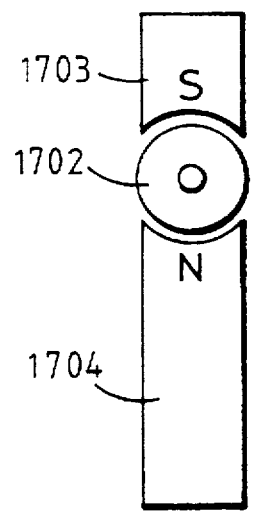
FIG. 17  FIG. 18  FIG. 19
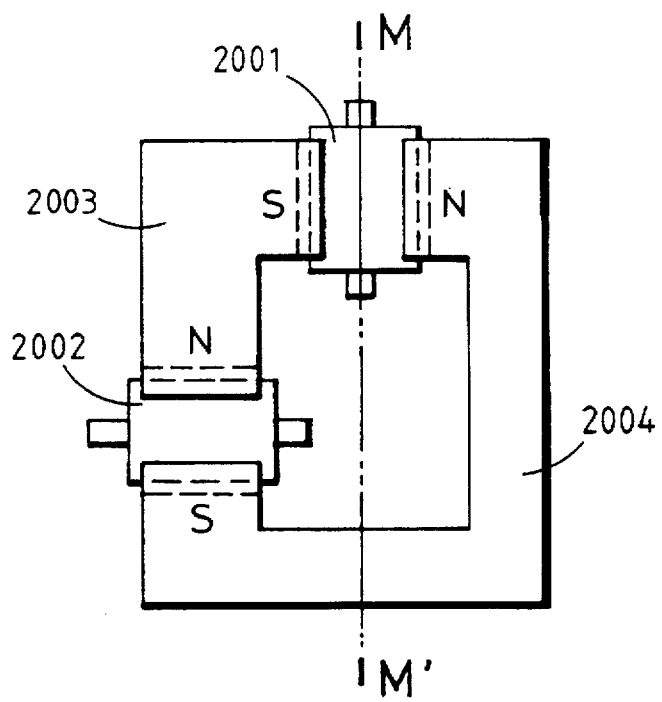
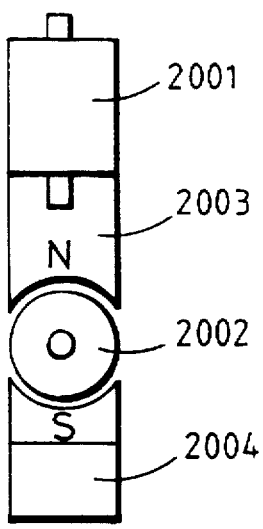
FIG. 20  FIG. 21

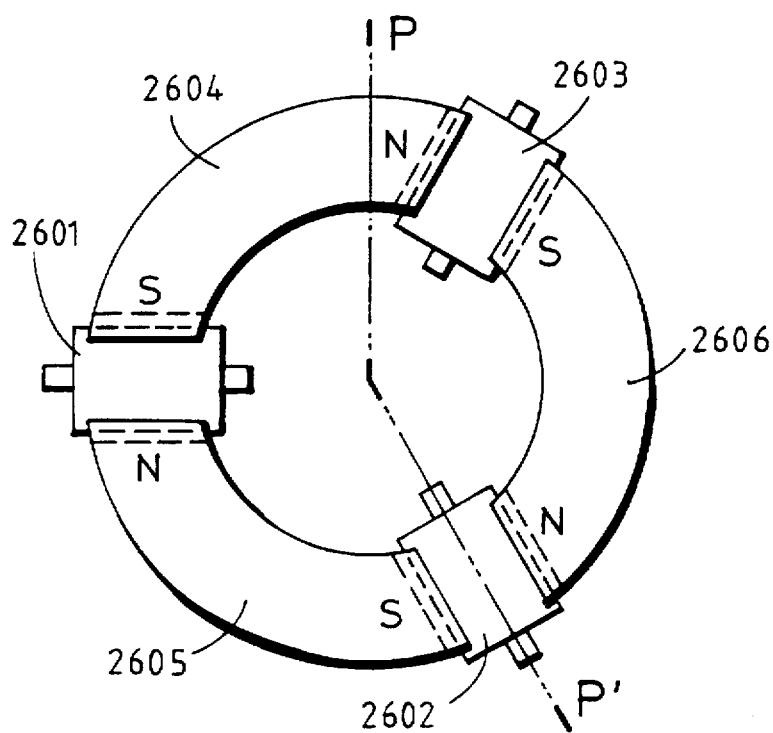
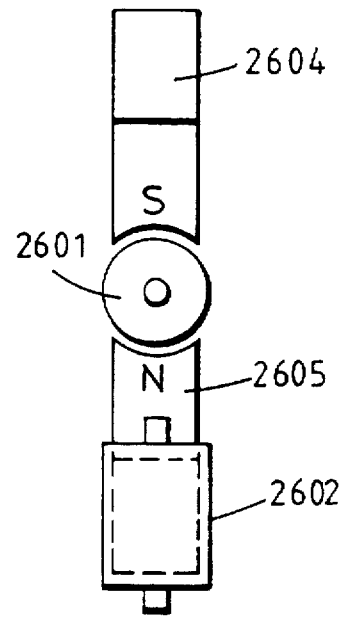
FIG. 26  FIG. 27
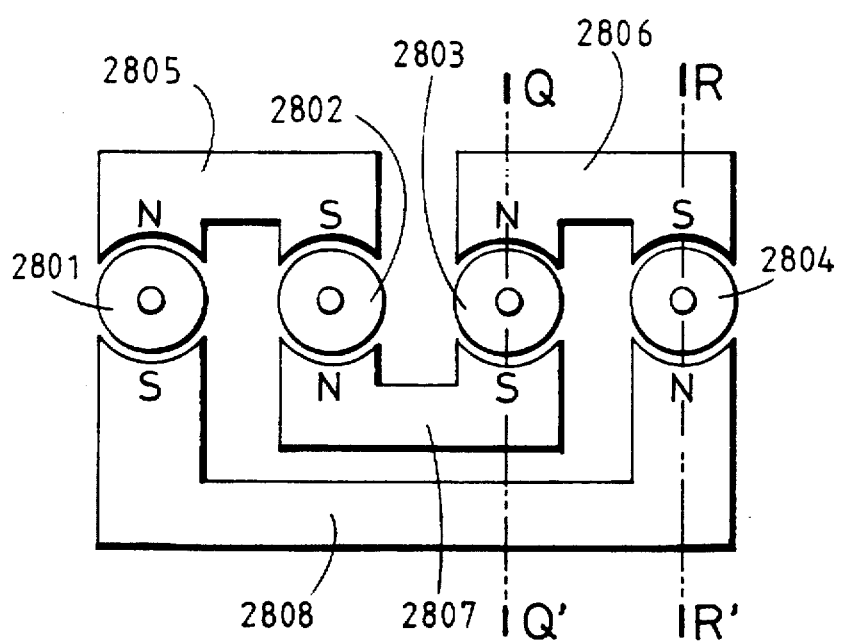
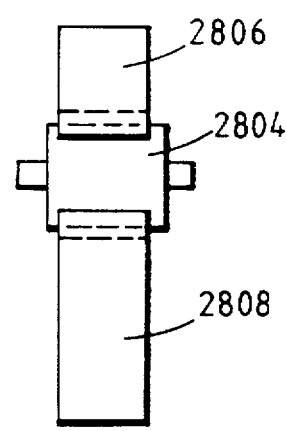
FIG. 28  FIG. 29

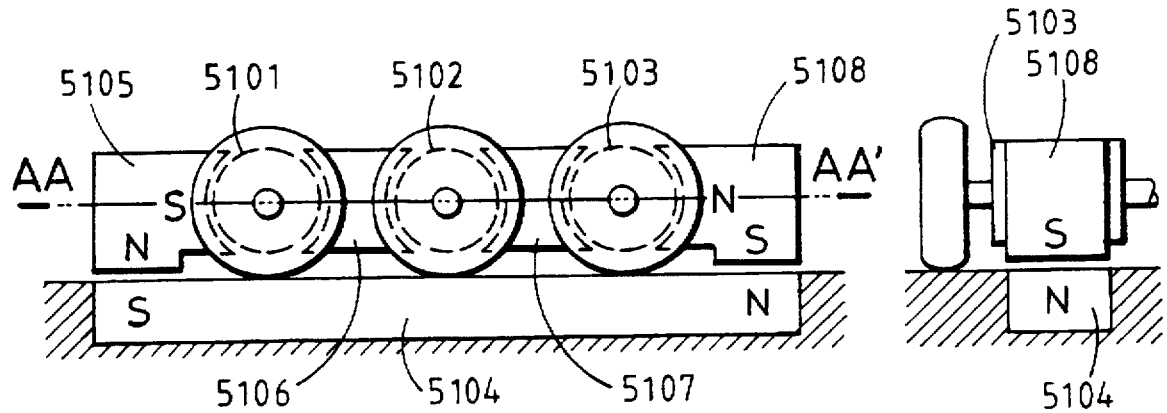
FIG. 51
FIG. 53
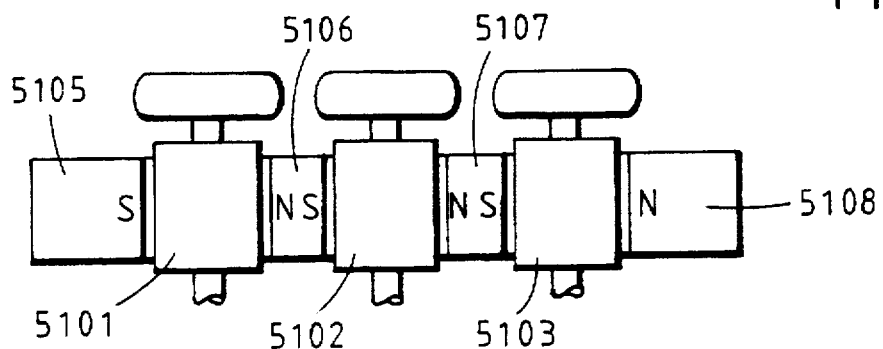
FIG. 52
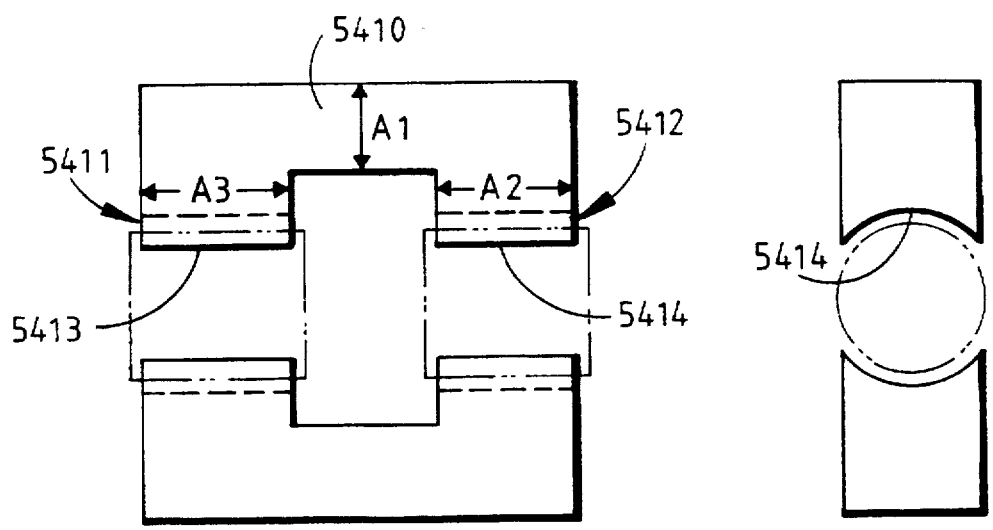
FIG. 54
FIG. 55

CO-AXIAL MAGNETIC CIRCUIT TYPE COMPOUND ROTOR ELECTRICAL MACHINE

This application is a Continuation of application Ser. No. 08/324,664, filed Oct. 18, 1994, now abandoned.

SUMMARY OF THE INVENTION

The disclosed co-axial magnetic circuit type compound rotor electrical machine, which can be arranged either as a motor or generator, uses a unique magnetic circuit structure in which the magnetic circuits extend axially and are mutually connected in series or in series and parallel, to achieve the follow effects:

- The overall combined magnetic circuit is shorter, weighs less and has a lower excitation efficiency than conventional arrangement;
- The rotor is externally exposed, providing better heat dissipation, and the rotor inside the casing can directly drive the external transmission;
- The magnetic fields of the individual electrical machines have the same magnetic flux density characteristics, and their series or series and parallel combined operations are not effected by the different hystereses of the individual electrical machines, improving stability;
- The magnetic circuits of the various different types of permanent magnet, winding, or other commutator type electrical machines can be series combined for mixed operation, providing the advantage of multiple selections of different electrical machine types;
- The inertia of the rotor is reduced;
- The rotor can be embodied as required by various geometrical rotor shapes such as cylindrical type, disk type, cone type, linear type or cup type, etc., increasing compatibility with different matching machine designs.

This design can be applied in various embodiments of AC or DC generators or motors, or mixed combinations, while still providing the advantages described above.

BRIEF DESCRIPTION OF THE DRAWINGS

FIG. 1 is a plan view of a preferred embodiment of the invention in which two rotor axial structures are installed on the same shaft.

FIG. 2 is the A-A40 sectional view of FIG. 1.

FIG. 3 is an application example of multiple axial structure installations using the preferred embodiment of FIG. 1.

FIG. 4 is the B-B' sectional view of FIG. 3.

FIG. 12 is the G-G' sectional view of FIG. 11.

FIG. 13 is the H-H' sectional view of FIG. 11.

FIG. 14 is a plan view of a preferred embodiment of the invention including two staged rotors with a 180° electrical phase difference.

FIG. 15 is the I-I' sectional view of FIG. 14.

FIG. 16 is the J-J' sectional view of FIG. 14.

FIG. 17 is a plan view of a preferred embodiment of the invention including series combined magnetic circuits constituted by multiple rotors with different axes.

FIG. 18 is the K-K' sectional view of FIG. 17.

FIG. 19 is the L-L' sectional view of FIG. 17.

FIG. 20 is a plan view of a preferred embodiment of the invention including series combined magnetic circuits constituted by multiple rotors installed perpendicularly in a closed magnetic circuit with perpendicular axes.

FIG. 21 is the M-M' sectional view of FIG. 20.

FIG. 26 is a plan view of a preferred embodiment of the invention including series combined magnetic circuits and multiple independently driven rotors.

FIG. 27 is the P-P' sectional view of FIG. 26.

FIG. 28 is a plan view of a preferred embodiment of the invention including a compound electrical machine structure comprises of multiple rotors and cross multi-layered field magnetic circuits.

FIG. 29 is the Q-Q' sectional view of FIG. 28.

FIG. 51 is a plan view of a preferred embodiment of the invention in which the compound electrical machine structure is comprises of multiple linearly arranged magnetic circuits and side auxiliary magnetic circuits to constitute a closed magnetic circuit, whereby the auxiliary magnetic circuit is used as a guide rail.

FIG. 52 is the AA-AA' sectional view of FIG. 51.

FIG. 53 is the side of view of FIG. 51.

FIG. 54 is a plan view of a preferred embodiment of the invention illustrating the field magnetic circuit and excitation structure of the examples show in FIG. 1-16.

FIG. 55 is the side view of FIG. 54.

DETAILED DESCRIPTION OF THE INVENTION

Figure 5:
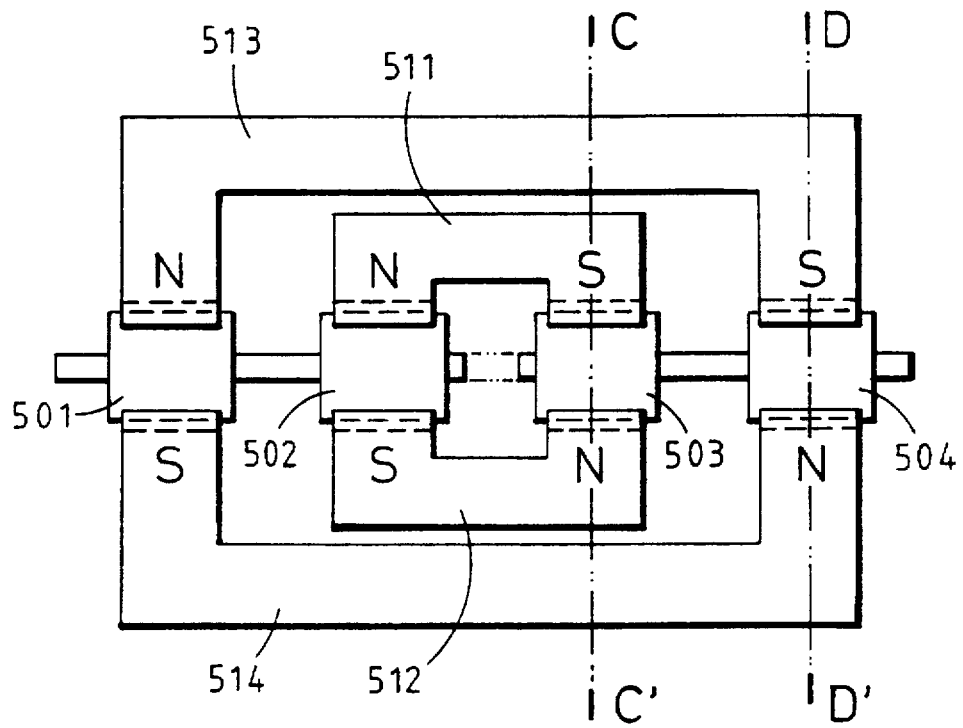
FIG. 5 is a plan view of a preferred embodiment of the invention, including plane magnetic separated magnetic circuits and a multiple co-axial rotors compound structure.

The single machine of a conventional motor or generator is usually heavier than two half power capacity motors or generators in combination, and has worse heat dissipation due to the conventional radial type closed field magnetic circuit. As a result, even through characteristic differences may be present in multiple machines connected for parallel operation, due to the differences in individual field hysteresis, such electrical machines with different charac- teristics nevertheless have previously been compound operated to utilize different performance advantages of each single machine, some of which are good for starting, for example, and some are for driving. However, the problem of compatibility between the magnetic circuits has heretofore not been addressed. The disclosed co-axial magnetic circuit type compound rotor electrical machine, on the other hand, addresses this problem by providing a particular magnetic circuit structure in which the magnetic circuits are axially extended and are mutually series combined or series and parallel combined by combining two or more than two rotors as well as accessories such as a casing and bearings made of non-magnetically conductive materials, as follows:

Each rotor has a corresponding magnetic pole, and the magnetic poles of each neighboring motor are connected by the installed conductive magnetic circuit, so as to form a closed magnetic circuit with each rotor;

The magnetic poles of neighboring electrical machines are connected by conductive magnetic circuits having difference polarities;

The magnetic pole of the electrical machine can be a permanent magnet type pole, a winding excitation type pole, or a mixture of both;

An individual electrical machine has at least two or more than two field magnetic poles, and no magnetic circuit structure is provided to connect the magnetic poles in the same electrical machine;

An individual electrical machine can be a generator or a motor or both;

The individual electrical machines can be of either the same or different types of electrical machines;

The individual electrical machines can have the same or different characteristics;

The magnetic filed or rotor winding of the individual electrical machine can be series combined, parallel combined or series and parallel combined;

The individual electrical machines can be operated independently or together.

The co-axial magnetic circuit type compound rotor electrical machine having the above characteristics can be varied to meet different application requirements according to the following embodiments in which:

A: The electrical machine magnetic circuit structure is comprised of two or more than two magnetic circuits to form a closed magnetic circuit through the common co-axial magnetic circuit structure, each rotor has an independent rotating shaft to operate independently or together with others, and the relationship between the rotating shafts can be a co-axial series arrangement, a multiple parallel rotating shaft arrangement, or a non-parallel rotating shaft arrangement arranged in a multi-directional structure or a mixture of series and parallel combinations.

B: The electrical machine magnetic circuit structure is comprises of two or more than two magnetic circuits to constitute a closed magnetic circuit through the common co-axial magnetic structure, and the individual rotors have a common shaft to drive the load;

C: Embodiments A and B are mixed, i.e., contain a combination of independent rotating shafts and common rotating shafts;

D: The structure of A, B and C are applied in electrical machines with different numbers of poles, including AC or DC, brushed or brushless, machines operating as a motor or generator or a mixture of both.

Variations A-D will now be described in more detail:

In the embodiment of FIGS. 1 and 2, the two electrical machine rotors are operated individually or have mutual coupled axes, and each electrical machine has at least a pair of field magnetic poles, with the two electrical machines and their rotor corresponding field magnetic poles being mutually connected by the conductive magnetic material along the rotor axes, and of different polarities, to form an axially closed magnetic circuit with the two rotor iron cores together. In this embodiment, the bearings, windings, cooling fins, and casing are made of a poorly conductive magnetic material, and components such as the commutators, brushes, brush holders, brush springs, etc. for embodiments using a DC electrical machine structure are installed at the relevant locations based on the electrical machine operations, the relationships between the magnetic circuit and the rotor being as follows:

The two electrical machine rotors 101, 102, which may be DC or AC motor or generator rotors, have rotating shafts that can be series combined or separated for independent driving and include a single body on the same axis or bodies connected by junctions made of conductive or non-conductive magnetic material;

The field magnetic iron cores 103, 104 form a magnetic circuit and poles in separated forms or in one body, and in the case of a DC electrical machine, are made of good conductive magnetic material, and in the case of AC electrical machine, are made of conductive magnetic material with low eddy current loss and low iron loss, the two field magnetic circuit iron cores 103, 104 being placed to have a 180° electrical angle difference, installed to coincide in the axial direction, and coupled with the rotor acting surfaces of the two electrical machines. There is no magnetic circuit structure to connect between field magnetic poles in the individual electrical machines, and the number of field magnetic circuits corresponding to the rotor poles and numbers, so that the field magnetic poles which are individually coupled with the two ends of the two respective rotors are of different polarities, while the neighboring magnetic poles coupled with the same rotor re also of different polarities.

Similarly, in the preferred embodiment show in FIGS. 3 and 4, which uses multiple installations of the type shown in FIG. 1, the rotor rotating shaft can be series combined or separated for independent driving, or partially series combined and independently driven and the series combination methods can be obtained by a single body at the axis or by using connection junctions made of conductive or non-conductive magnetic material.

Figures 6, 7:
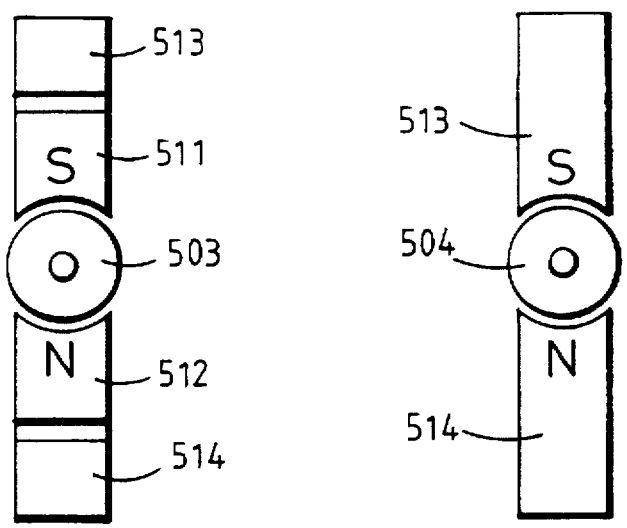
FIG. 6 is the C-C' sectional view of FIG. 5.
FIG. 7 is the D-D' sectional view of FIG. 5.

FIGS. 5–7 show a co-axial magnetic circuit type compound rotor electrical machine having plane separated magnetic circuits constituted by multiple co-axial rotors.

In this embodiment, the bearings, windings, cooling fins, and casing are made of poorly conductive magnetic material and the components such as the commutators, brushes, brush holders, brush springs, etc. for embodiments in a DC electrical machine structure are installed at relevant locations based on the desired electrical machine operations, the relationships between the magnetic circuit the rotor being as follows:

The rotating shafts of the electrical machine rotors 501–504 can be series combined or separated for independent driving, and combined in a single body at the same axis or connected by junctions made of conductive or non-conductive magnetic material;

The field magnetic iron cores 511–514 include a pair of field magnetic poles and circuits coupled with the acting surfaces of the rotors 502, 503 to form a closed magnetic circuit, and another pair of magnetic poles 513, 514 are coupled with the acting surfaces of rotors 501, 504 to constitute another closed magnetic circuit, the two magnetic circuits being installed to be mutually wrapped up in layers at the same plane, with no magnetic circuit structure to connect between the filed magnetic poles in individual electrical machines, and the number of field magnetic circuits corresponding to the number of rotor poles.

Figure 8:
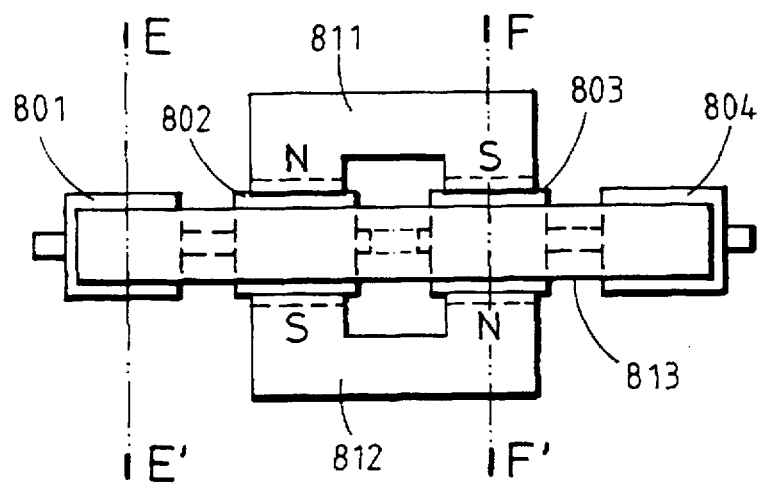
FIG. 8 is a plan view of another preferred embodiment of the invention including cross distributed separated magnetic circuits constituted by a multiple co-axial rotor compound structure.
Figure 9:
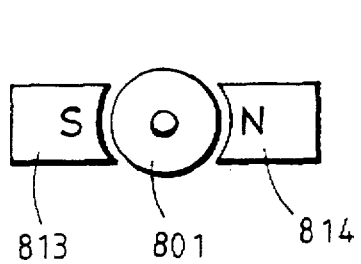
FIG. 9 is the E-E' sectional view of FIG. 8.
Figure 10:
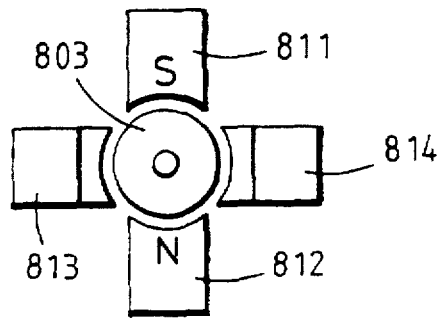
FIG. 10 is the F-F' sectional view of FIG. 8.

In the preferred embodiment shown in FIGS. 8–10, the co-axial magnetic circuit type compound rotor electrical machine includes cross distributed separated magnetic circuits constituted by multiple co-axial rotors.

As in the previous embodiments, the bearings, windings, cooling fins, and casing are made of poorly conductive magnetic material and the components such as commutators, brushes, brush holders, brush springs, etc. for embodiments involving a DC electrical machine structure are installed at relevant locations based on the desired electrical machine operations, with the relationships between the magnetic circuit and the rotor being as follows:

The rotating shafts of the electrical machine rotors 801–804 can be series combined or separated for independent driving, and combined in a single body at the same axis or connected by junctions made of conductive or non-conductive magnetic material;

The filed magnetic iron cores 811–814 include a pair of field magnetic poles and circuits coupled with the acting surfaces of the rotors 802, 803 to form a closed magnetic circuit, and field magnetic pole pairs 813–814 include additional magnetic poles and circuits coupled with the acting surfaces of a the rotors 801, 804 to form another closed magnetic circuit, the two magnetic circuits being cross installed with no magnetic circuit structure to connect between the field magnetic poles in individual electrical machines, and the number of field magnetic circuits are corresponding to the number of rotor poles.

Figure 11:
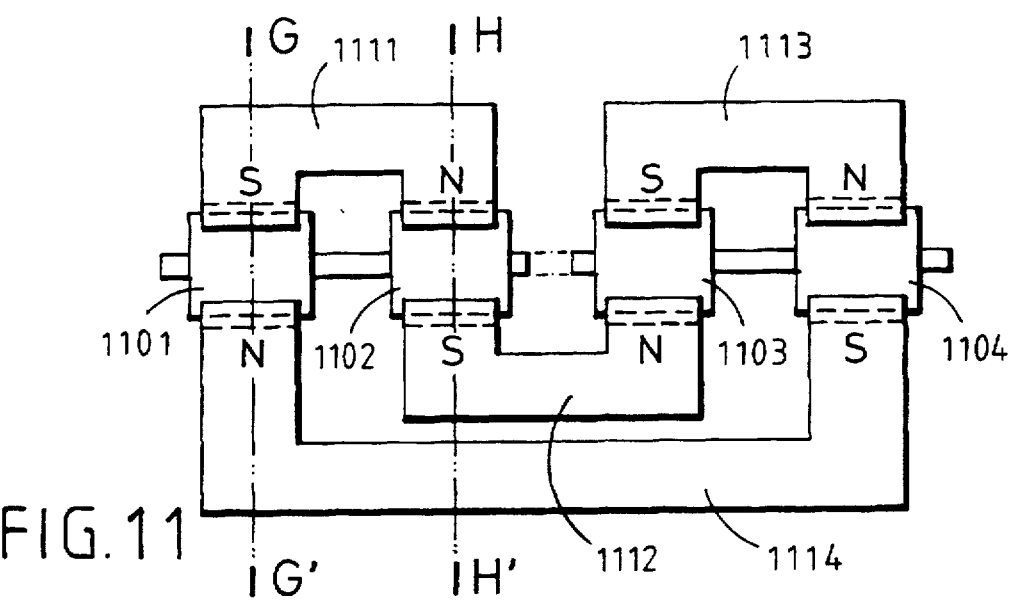
FIG. 11 is a plan view of a preferred embodiment of the invention including plane series combined magnetic circuits constituted by a multiple coaxial rotors compound structure.

In the preferred embodiment shown in FIGS. 11–13, the co-axial magnetic circuit type compound rotor electrical machine includes plane series combined magnetic circuits constituted by multiple co-axial rotors.

Again, the bearings, windings, cooling fins, and casing are made of poorly conductive magnetic material and the components such as commutators, brushes, brush holders, brush springs, etc. for embodiments involving a DC electrical machine structure are installed at relevant locations based on the desired electrical machine operations, the relationships between the magnetic circuit and the rotor being as follows:

The electrical machine rotors 1101–1104 are series combined or separated for independent driving, the series combination methods including use of a single body at the same axis or connection by the junctions made of conductive or non-conductive magnetic material;

The field magnetic iron core 1111 is used as a base plane to couple with the acting surfaces of the rotors 1101, 1102 and the field magnetic iron core 1112 is further coupled with the acting surfaces of the rotors 1102 and 1103 from the opposite side, the field magnetic iron core 1113 is further coupled with the acting surfaces of the rotors 1103 and 1104 from the base plane, and the field magnetic iron core 1114 is further to encircle from the opposite side while maintaining a proper clearance to pass by the field magnetic circuit iron core 1112 to couple with the acting surfaces of rotors 1101 and 1104 to form a closed magnetic circuit, with no magnetic circuit structure to connect between the field magnetic poles in individual electrical machines, and the number of field magnetic circuits corresponding to the number of rotor poles.

FIGS. 14–16 show a co-axial magnetic circuit type compound rotor electrical machine including two staged rotors having a 180° electrical angle difference.

In this embodiment, the bearings, windings, cooling fins, and casing are made of poorly conductive magnetic material and the components such as the commutators, brushes, brush holders, brush springs, etc. for embodiment involving a DC electrical machine structure are installed at the appropriate locations based on desired electrical machine operations, the relationships between the magnetic circuit and the rotor being as follows:

The electrical machine rotors 1401, 1402 are made up of at least one pair of winding type rotors constituted by rotor iron cores on a common rotating shaft. In the case of a DC electrical machine, the rotors have a common commutator 1403, and in the case of an AC electrical machine, the rotors have a common conducting ring, with the same winding being installed and inserted in the respective rotors simultaneously while maintaining mutual 180° electrical angle difference;

The filed magnetic iron cores 1404, 1405 are installed at the same mechanical angle to constitute the acting surfaces for coupling with a pair of rotors, to thereby provide torque in the driving direction, again with no magnetic circuit structure to connect between the field magnetic poles in individual electrical machines, and the number of field magnetic circuits corresponding to the number of rotor poles.

FIGS. 17–19 show a co-axial magnetic circuit type compound rotor electrical machine including series combined magnetic circuits constituted by multiple rotors structure with different axes.

Once again, the bearings, windings, cooling fins, and casing are made of poorly conductive magnetic material and the components such as the commutators, brushes, brush holders, brush springs, etc. for embodiments involving a DC electrical machine structure are installed at appropriate locations based on desired electrical machine operations, the relationships between the magnetic circuit and the rotor being as follows:

The electrical machine rotors 1701, 1702 have shafts which are independently operated with different axes;

The field magnetic iron cores 1703, 1704 include two field magnetic circuit iron cores, the first field being coupled with the acting surfaces of the two rotors, and the two field magnetic circuit iron cores and rotors forming a closed magnetic circuit with the number of field magnetic circuits corresponding to the number of poles.

The above-described co-axial magnetic circuit type compound rotor electrical machine including series combined magnetic circuits and multiple rotors with different axes can be utilized in numerous applications according to the number of rotors and the changes in rotating axial directions to increase application flexibility, as illustrated in FIGS. 20–27 and as follows:

FIGS. 20 and 21 show a co-axial magnetic circuit type compound rotor electrical machine including series combined magnetic circuits constituted by multiple rotors installed perpendicularly to form a closed magnetic circuit with perpendicular axes.

In this embodiment, the independently operated electrical machine rotors 2001, 2002 and the field magnetic circuit iron cores 2003, 2004 are cross series combined together to constitute a quasi-quadrangle magnetic circuit, and the two rotors are respectively installed with axes at a 90° angle difference, while the rotors can be operated to drive the load independently or together.

Figure 22:
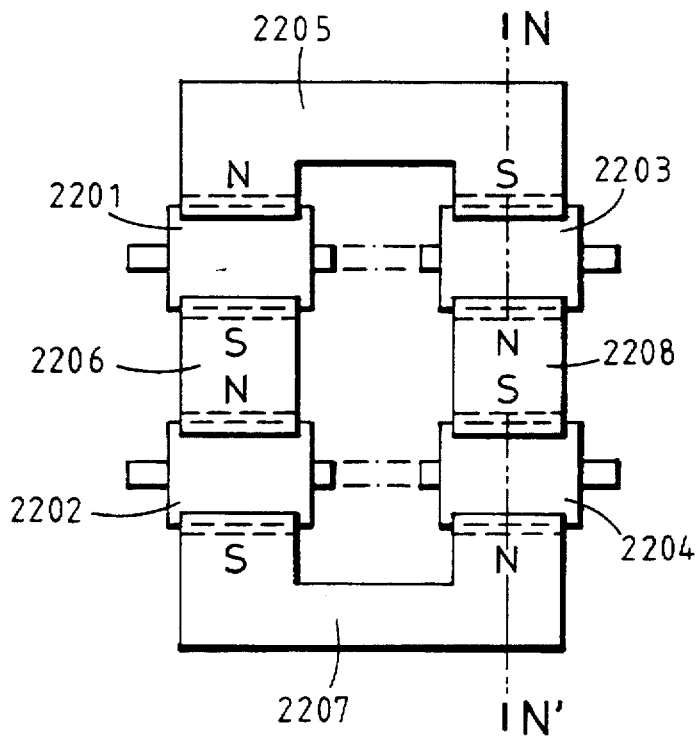
FIG. 22 is a plan view of a preferred embodiment of the invention including series combined magnetic circuits and multiple independently driven rotors.
Figure 23:
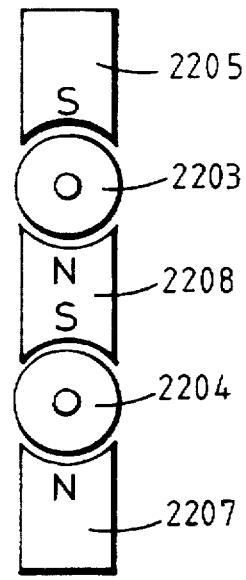
FIG. 23 is the N-N' sectional view of FIG. 22.

As shown in FIGS. 22 and 23, a co-axial magnetic circuit type compound rotor electrical machine including series combined magnetic circuits and multiple independently driven rotors, can have multiple rotors with different axes installed symmetrically in parallel and series combined with the field magnetic circuits.

In this embodiment, the independently operated electrical machine rotors 2201–2204 and the field magnetic circuit iron cores 2205–2208 are cross series combined together to constitute a closed type quasi-quadrangle magnetic circuit, the rotating shafts of the four rotors being installed to be parallel in the front-rear direction and connected respectively in two pairs to common axes in the left-right direction in the same plane to drive the load independently or together.

Figure 24:
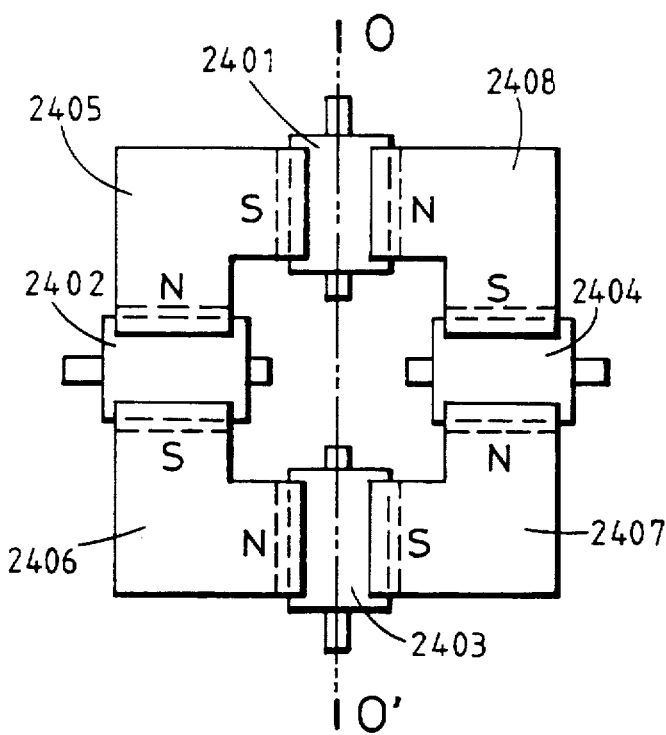
FIG. 24 is a plan view of a preferred embodiment of the invention including series combined magnetic circuits and multiple independently driven rotors.
Figure 25:
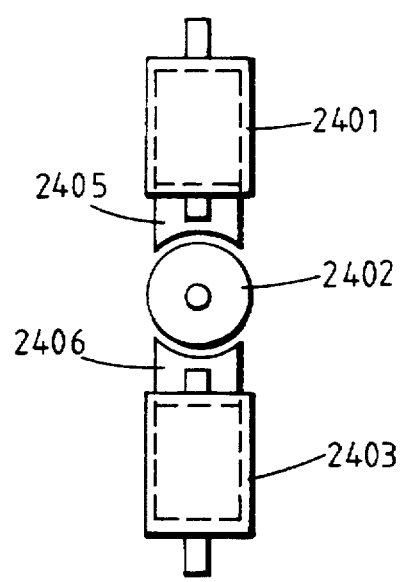
FIG. 25 is the O-O' sectional view of FIG. 24.
Figure 30:
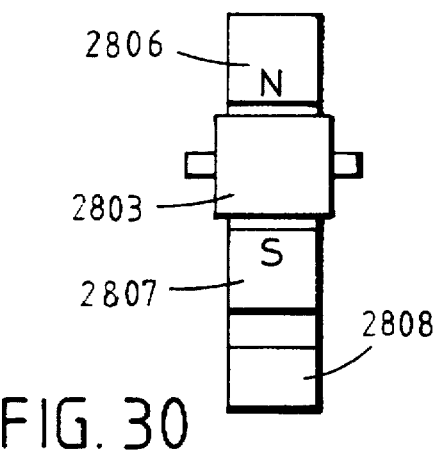
FIG. 30 is the R-R' sectional view of FIG. 28.
Figure 31:
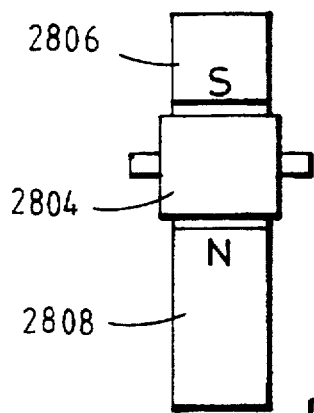
FIG. 31 is the sectional view of FIG. 28.

FIGS. 24 and 25 show a co-axial magnetic circuit type compounds rotor electrical machine including series combined magnetic circuits and multiple independently driven rotor axes radially installed to constitute a series combined field magnetic circuit structure.

In this embodiment, the independently operated electrical machine rotors 2401–2404 and the field magnetic circuit iron cores 2405–2408 are cross series combined together to constitute a closed type quasi-quadrangle magnetic circuit, the rotating shafts of the four rotors being installed at a same plane and extending in four directions radially at respective 90° mechanical angel differences to drive the load independently or together.

FIGS. 26 and 27 show a co-axial magnetic circuit type compound rotor electrical machine including series combined magnetic circuits and multiple independently driven rotors in which the multiple rotors with different axes are installed and distributed in the radial direction while coupling with a common transmission component.

In this embodiment, the independently operated electrical machine rotors 2601–2603 and the field magnetic circuit iron cores 2604–2606 are cross series combined together to constitute a closed type circular or quasi-circular magnetic circuit, the rotating shafts of the three rotors being installed at a same plane and extending in three directions radially at respective 120° mechanical angle differences to drive the load individually or together.

In each of the embodiments of FIGS. 20–27, the bearings, windings, cooling fins, and casing are made of poorly conductive material and the components such as the commutators, brushes, brush holders, brush springs, etc. for embodiments involving a DC electrical machine structure are installed at appropriate locations based on desired electrical machine operations. For the example of a two pole electrical machine, in all circumstances, if the two field magnetic poles beside the rotor have different polarities, then the field magnetic circuit iron cores and the rotor iron cores constitute a closed magnetic circuit with the neighboring magnetic pole as a composing unit; and if the electrical machine structure is of the multiple pole type with more than one pair, multiple independent closed magnetic circuits are formed based on the same principle as stated above, and the number of installed rotors can be flexibly selected based on requirements, with rotors having the same axis being made up of rotors of a DC or AC motor or generator, the rotating shafts of the rotors being series combined or separated to be driven independently, the series combination methods including provision of a single body or connection by junctions made of conductive or non-conductive magnetic material, such that the rotors with different aces can be driven independently or additionally installed with transmission components (such as gears) for mutual coupling to drive a load.

In the embodiment of FIGS. 28, 29, 30 and 31, a co-axial magnetic circuit type compound rotor electrical machine includes a compound machine structure comprised of multiple rotors and cross multi-layered field magnetic circuits.

In each of the embodiments of FIGS. 28–31, the bearings, windings, cooling fins, and casing are made of poorly conductive material and components such as the commutators, brushes, brush holders, brush springs, etc. for embodiments involving a DC electrical machine structure are installed at appropriate locations based on desired electrical machine operations, the relationships between the magnetic circuit and the rotor being as follows:

The rotating shaft of each of electrical machine rotors 2801–2804 are independently installed and arranged in parallel to drive the load individually or together;

The field magnetic iron core 2805 is coupled with the rotors 2802, 2803 at the same exterior sides, wherein the pole surfaces to the two rotor exterior sides have different polarities; the field magnetic core 2806 is coupled with the other side of the rotor 2803 and the same side of rotor 2804, with its two end pole surfaces having different polarities; the core 2807 is coupled with the rotors 2801 and 2802 at the same sides, with its two end pole surfaces having different polarities; and core 2808 is coupled with the rotors 2801 and 2804 at the same sides, with its two end pole surfaces having different polarities; the above described field magnetic circuit and rotor iron cores being mutually series combined to form a closed magnetic circuit;

The two respective field magnetic poles beside the rotor have different polarities.

Figure 32:
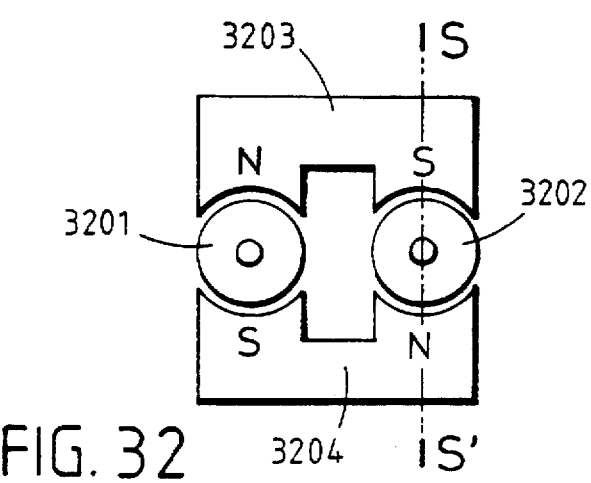
FIG. 32 is a plan view of a preferred embodiment of the invention in which multiple rotors are series combined with field magnetic circuits to constitute a closed magnetic circuit.
Figure 33:
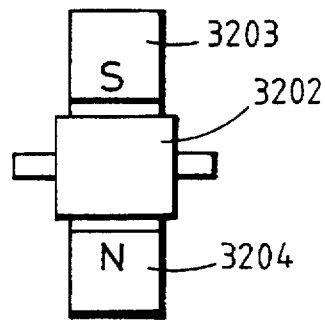
FIG. 33 is the S-S' sectional view of FIG. 32.

As shown in FIGS. 32 and 33, a co-axial magnetic circuit type compound rotor electrical machine includes multiple rotors series combined with the field magnetic circuits to constitute a closed magnetic circuit.

In this embodiment, the bearings, windings, cooling fins, and casing are made of poorly conductive magnetic material and the components such as the commutators, brushes, brush holders, brush springs, etc. for embodiment involving a DC electrical machine structure are installed at appropriate locations based on desired electrical machine operations, the relationships between the magnetic circuit the rotor being mainly comprised of the following:

The rotating shaft of each of electrical machine rotors 3201, 3202 are independently installed and arranged in parallel to drive the load individually or together;

The field magnetic iron core 3203 is coupled with the rotors 3201, 3202 at the same sides, with its two end pole surfaces having different polarities; the core 3204 is coupled with the rotors 3201 and 3202 at the other sides, with its two end pole surfaces having different polarities; and the above described field magnetic circuit and rotor iron cores are mutually series combined to form a closed magnetic circuit, the two field magnetic poles of a same rotor thereby having different polarities.

Figure 34:
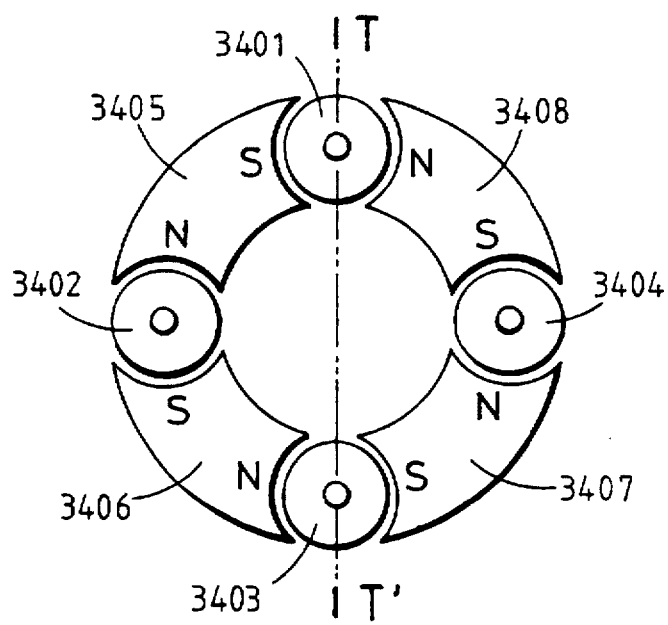
FIG. 34 is a plan view of a preferred embodiment of the invention in which multiple rotors are series combined with field magnetic circuits to constitute a compound electrical machine.
Figure 35:
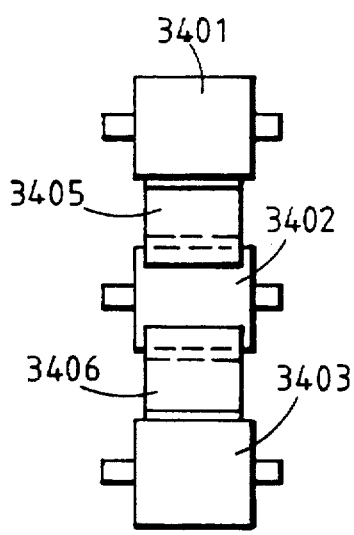
FIG. 35 is the T-T' sectional view of FIG. 34.

In the embodiment of FIGS. 34 and 35, the co-axial magnetic circuit type compound rotor electrical machine includes multiple rotors series combined with field magnetic circuits to constitute a compound electrical machine, the independently operated electrical machine rotors 3401–3404 and the field magnetic circuit iron cores 3405–3408 being cross installed together to constitute a circular type closed magnetic circuit, and the rotating shafts of the four rotors being respectively installed at a 90° angle difference on the same plane pointing in the same direction to drive the load individually or together.

Figure 36:
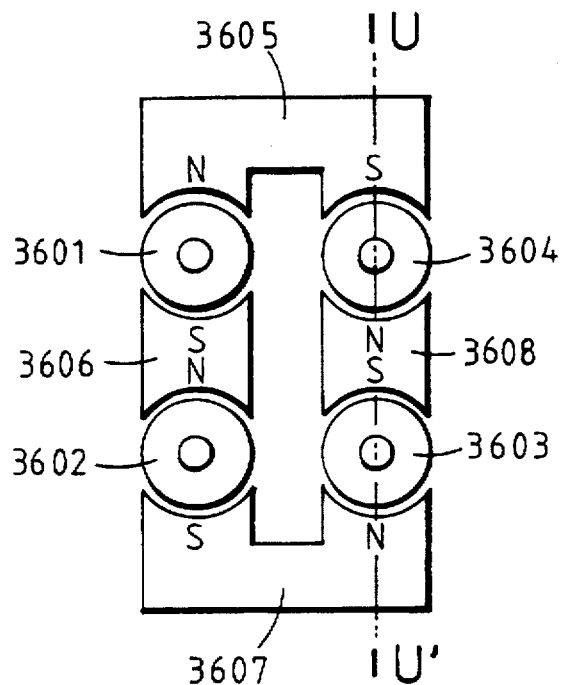
FIG. 36 is a plan view of a preferred embodiment of the invention in which multiple rotors are series combined with field magnetic circuits to constitute a compound electrical machine.
Figure 37:
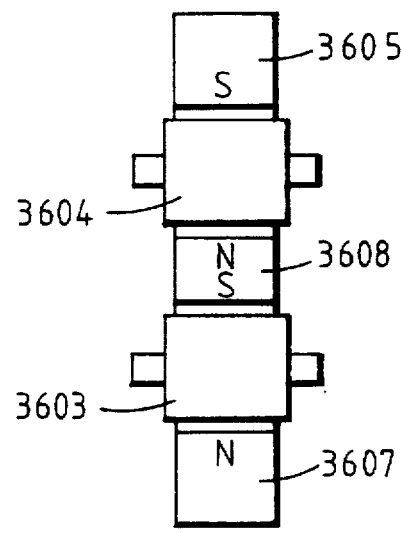
FIG. 37 is the U-U' sectional view of FIG. 36.

FIGS. 36 and 37 show a co-axial magnetic circuit type compound rotor electrical machine in which the multiple rotors are series combined with the field magnetic circuits to form a compound electrical machine, and in which the independently operated electrical machine rotors 3601–3604 and the field magnetic circuit iron cores 3605–3608 are cross installed together to constitute a closed type quasi-quadrangle type closed magnetic circuit, the rotating shafts of the four rotors pointing in a same direction and each of the two opposite sides of the magnetic circuit being installed with two rotors to drive the load individually or together.

Figure 38:
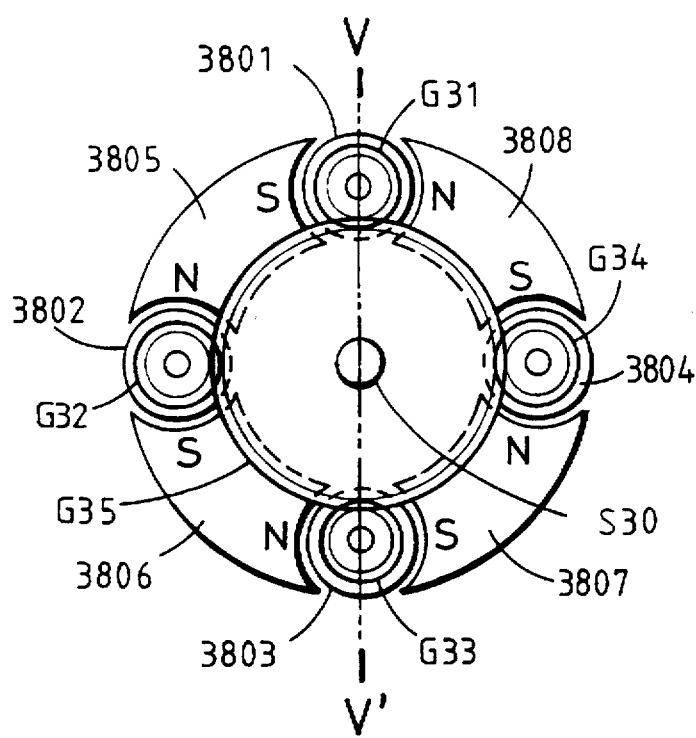
FIG. 38 is a plan view of a preferred embodiment of the invention in which multiple rotors are series combined with the field magnetic circuits to constitute a closed circuit, whereby the transmission components are utilized to provide the mechanical work output/input.
Figure 39:
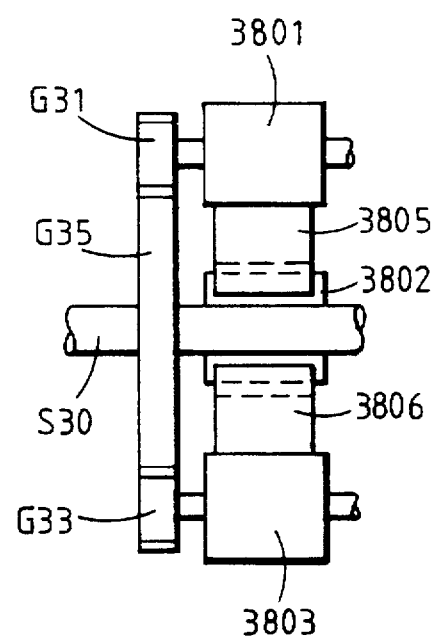
FIG. 39 is the V-V' sectional view of FIG. 38.

FIGS. 38 and 39 show a co-axial magnetic circuit type compound rotor electrical machine in which multiple rotors are series combined with the field magnetic circuits to constitute a closed circuit, and the transmission components are utilized to provide the mechanical work output/input.

In this embodiment, the bearings, windows, cooling fins, and casing are made of a poorly good conductive magnetic material, and the components such as commutators, brushes, brush holders, brush springs, etc. for embodiment involving a DC electrical machine structure are installed at appropriate locations based on desired electrical machine operations, the relationships between the magnetic circuit and the rotor being as follows:

The rotating shaft of each of the rotors 3801–3804 is independently installed and the shafts are arranged in parallel, so that the drive pinions G31–G34 are individually driven by the rotor to drive the center gear G35 and provide a common output for driving the output shaft S30. Alternatively, the above said gears can be replaced by friction wheels;

The field magnetic iron cores 3805–3808 are respectively cross coupled with the rotors to constitute a circular type closed magnetic circuit with the field magnetic poles at the tow sides of each rotor having different polarities.

Figure 40:
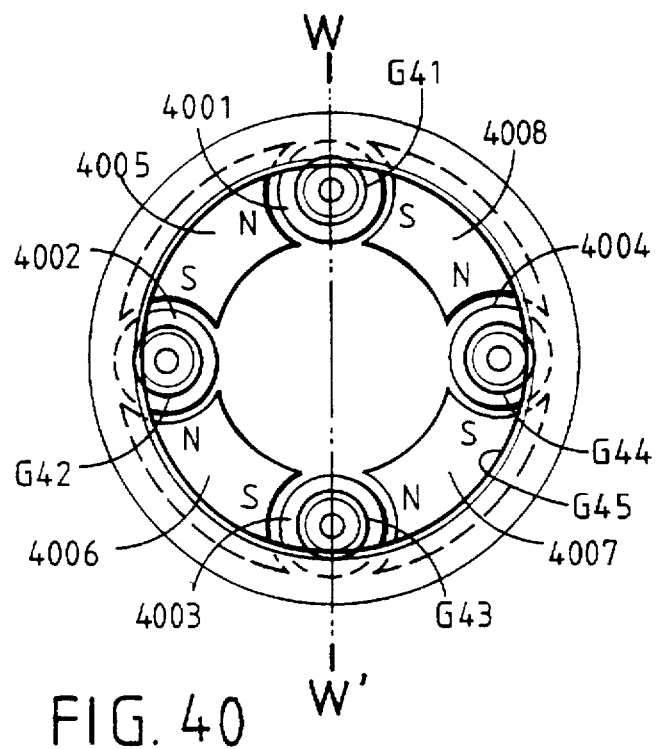
FIG. 40 is a plan view of a preferred embodiment of the invention in which multiple rotors are series combined with the field magnetic circuits to constitute a closed circuit, whereby the transmission components are utilized to provide the mechanical work output/input.
Figure 41:
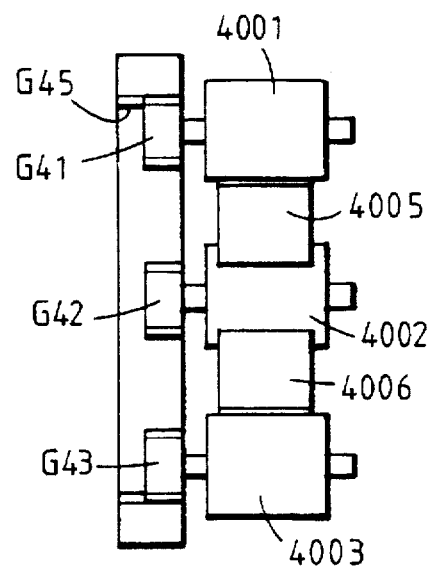
FIG. 41 is the W-W' sectional view of FIG. 40.

FIGS. 40 and 41 show a co-axial magnetic circuit type compound rotor electrical machine in which the multiple rotors are series combined with the field magnetic circuits to constitute a closed circuit, and the transmission components are utilized to provide a mechanical work output/input.

Again, in this embodiment, the bearings, windings, cooling fins, and casing are made of poorly conductive magnetic material and components such as commutators, brushes, brush holders, brush springs, etc. for embodiments involving a DC electrical machine structure are installed at appropriate locations based on electrical machine operations, the relationships between the magnetic circuit and the rotor being mainly comprised of the following:

The rotating shaft of each of electrical machine rotors 40001–4004 is independently installed and the shafts are arranged in parallel, the drive pinions G41–G44 being individually driven by the rotor to drive the big outer ring gear G45 and provide a common output and the above said gears being replaceable by friction wheels;

The field magnetic iron cores 4005–4008 are respectively cross coupled with the rotors to constitute a circular type closed magnetic circuit together, the field magnetic poles at the two sides of each rotor having different polarities.

In the embodiments of FIGS. 28–41, the bearings, windings, cooling fins, casing are made of poorly conductive magnetic material and the components such as the commutators, brushes, brush holders, brush springs, etc. for embodiments involving a DC electrical machine structure are installed at relevant locations based on electrical machine operations. In the case of a two pole electrical machine, in all circumstances, if the two field magnetic poles beside the rotor have different polarities, then the field magnetic circuit iron cores and the rotor iron cores constitute a closed magnetic circuit with the neighboring magnetic pole as a composing unit; and if the electrical machine structure is of the multiple pole type with more than one pair, the multiple independent closed magnetic circuits are constituted based on the same principle as stated above, the number of installed rotors being flexibly selectable based on requirements.

Figure 42:
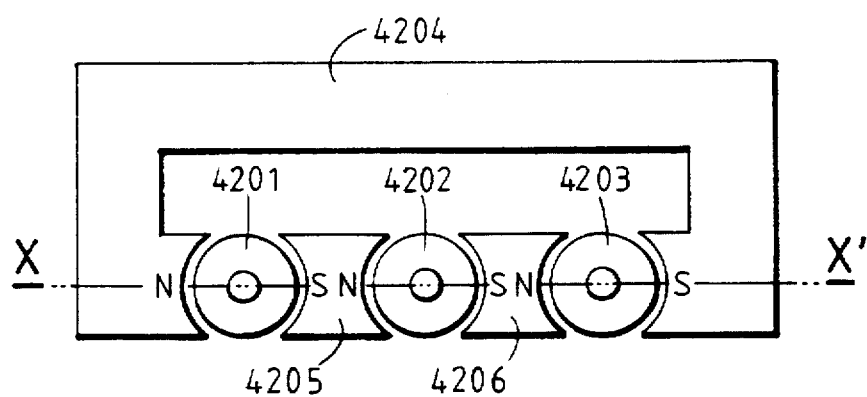
FIG. 42 is a plan view of a preferred embodiment of the invention in which the compound electrical machine structure is comprised of multiple linearly arranged magnetic circuits and side auxiliary magnetic circuits to form a closed magnetic circuit.
Figure 44:
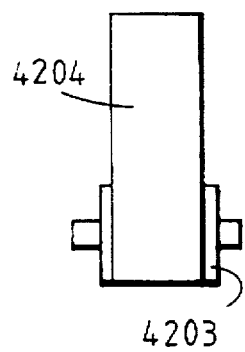
FIG. 44 is a side view of FIG. 42.
Figure 43:
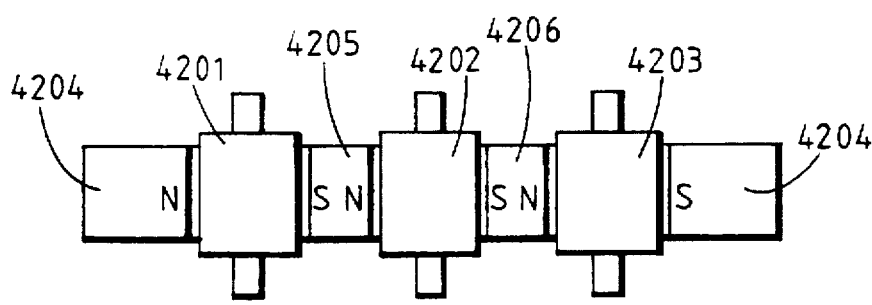
FIG. 43 is the X-X' sectional view of FIG. 42.

FIGS. 42–44 show a axial magnetic circuit type compound rotor electrical machine including multiple linearly arranged magnetic circuits and side auxiliary magnetic circuits which form a closed magnetic circuit.

In this embodiment, the bearings, windings, cooling fins, and casing are made of poorly conductive magnetic material and the components such as the commutators, brushes, brush holders, brush springs, etc. for embodiments involving a DC electrical machine structure are installed at relevant locations based on electrical machine operations, the relationships between the magnetic circuit and the rotor including the following:

- The rotating shaft of each of electrical machine rotors 4201–4203 are independently installed and arranged in parallel to drive the load individually or together, the rotors being arranged in parallel with different axes and rotating shafts being installed in parallel to drive the load individually or together;
- The field magnetic iron core 4202 is coupled with the frontmost rotor 4201 and the rearmost rotor 4203 to constitute the most exterior magnetic pole, while the cores 4205 and 4206 are cross series combined with the rotors in a linear arrangement to form a closed magnetic circuit with core 4204, and the magnetic poles at the two sides of each rotor have different polarities.

Figure 45:
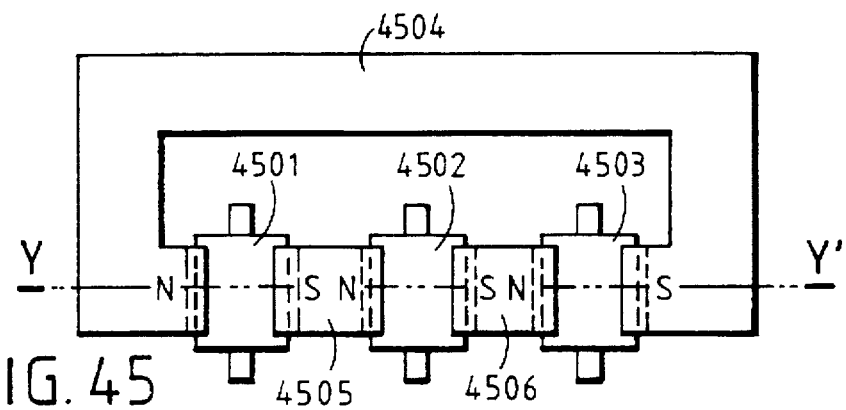
FIG. 45 is a plan view of a preferred embodiment of the invention in which the compound electrical machine structure is comprised of multiple linearly arranged magnetic circuits and the side auxiliary magnetic circuits to form a closed magnetic circuit.
Figure 47:
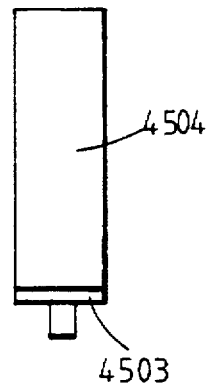
FIG. 47 is the side view of FIG. 45.
Figure 46:
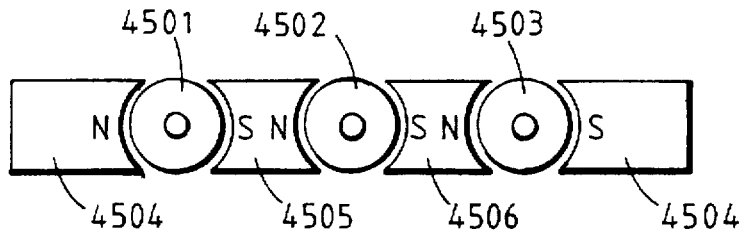
FIG. 46 is the Y-Y' sectional view of FIG. 45.

FIGS. 45–47 show a co-axial magnetic circuit type compound rotor electrical machine including multiple linearly arranged magnetic circuits and side auxiliary magnetic circuits forming closed magnetic circuit, in which the electrical machine rotors 4501–4503 and the field magnetic circuit iron cores 4504–4506 are cross installed together form a closed typed magnetic circuit, the field magnetic circuit iron cores 4505, 4506 being series installed between the rotors, and core 4504 having a "n" having a shape to encircle and couple between the front and rear rotors along the rotating shaft base plane of the rotors, the rotating shafts of rotors thus being arranged linearly in parallel to drive the load independently or together with the magnetic poles at the two sides of each rotor having different polarities.

Figure 48:
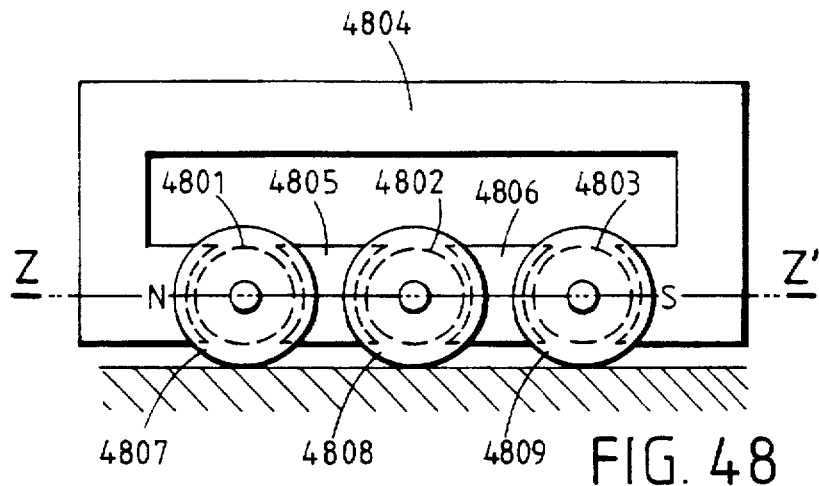
FIG. 48 is a plan view of a preferred embodiment of the invention in which the compound electrical machine structure is comprised of multiple linearly arranged magnetic circuits and side auxiliary magnetic circuits to constitute a closed magnetic circuit, and is matched with driving wheels for linear transmission.
Figure 50:
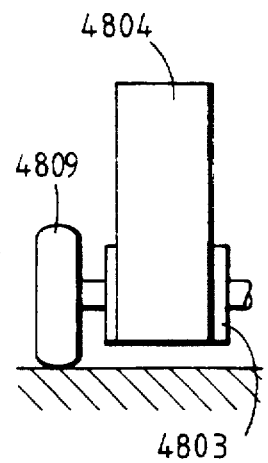
FIG. 50 is the side view of FIG. 48.
Figure 49:
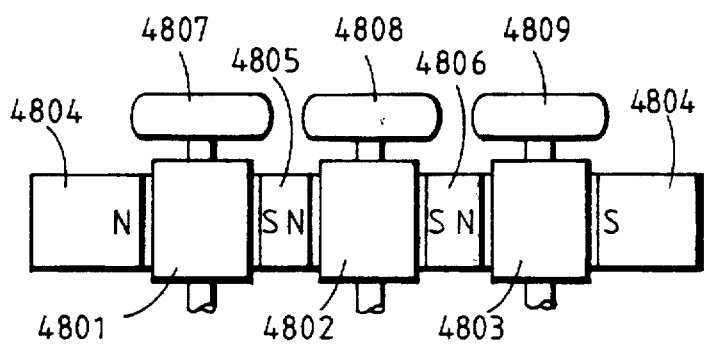
FIG. 49 is the Z-Z' sectional view of FIG. 48.

FIGS. 48–50 show a co-axial magnetic circuit type compound rotor electrical machine in which the compound electrical machine structure is made up of multiple linearly arranged magnetic circuits and side auxiliary magnetic circuits to form a closed magnetic circuit, which is matched with driving wheels for linear transmission.

In this embodiment, the electrical machine rotors 4801–4803 and the field magnetic circuit iron cores 4804–4806, are the same as in FIGS. 45–47 except that the rotating shaft of each rotor is provided with independently driven wheels 4807–4809 and coupled with the common load through nonconductive magnetic friction type transmission mechanisms to prevent the magnetic flux from directly passing through the individual rotors and generates distributions of closed short circuits.

FIGS. 51–53 show a co-axial magnetic circuit type compound rotor electrical machine made up of multiple linearly arranged magnetic circuits and side auxiliary magnetic circuits to form a closed magnetic circuit, and in which the auxiliary magnetic circuit is used as a guide rail.

In this embodiment, the electrical machine rotors 5101–5108 and the field magnetic circuit cores 5105–5108 are cross installed together constitute a closed type magnetic circuit, the rotating shafts of rotors being arranged linearly in parallel, and wherein each rotor individually drives the non-conductive magnetic transmission mechanism, including friction type or engaging type mechanism to couple with a common rail and prevent the magnetic flux from directly passing through the individual rotor to generate distributions of closed short circuits. The field magnetic circuit iron core 5104 is particularly installed at the loading side to be parallel with the rail and coupled with the exteriors of magnetic poles 5105, 5108 of the frontmost and rearmost rotors in relative motion to constitute part of the closed magnetic circuit, the field magnetic circuit iron cores 5106, 5107 being cross installed with the rotors, and the magnetic poles at the two sides of each rotor having different polarities.

In the embodiments of FIGS. 42–53, the bearings, windings, cooling fins, and casing are made of poorly conductive magnetic material and the components such as commutators, brushes, brush holders, brush springs, etc. for embodiments involving a DC electrical machine structure are installed at appropriate locations based on a desired electrical machine operations. For the example of two pole electrical machine, in all circumstances, if the two field magnetic poles besides the rotor are in different polarities, then the field magnetic circuit iron cores and the rotor iron cores constitute a closed magnetic circuit with the neighboring magnetic pole as a composing unit; and if the electrical machine structure is of a multiple poles type with more than one pair, the multiple independent closed magnetic circuits are constructed based on the same principle as stated above. Again, the number of installed rotors can be flexibly selected based on requirements.

FIGS. 54 and 55 show a co-axial magnetic circuit type compound rotor electrical machine including the field magnetic circuit and excitation structure of the embodying examples in FIGS. 1–16.

The magnetic pole structures shown in FIGS. 54 and 55 are characterized in the following:

The magnetic pole and circuit iron cores in general are similar to a "n" shape structure, having a middle magnetic circuit section 5410 for passing the magnetic flux and an A1 position for installing an excitation device, the extending direction of the magnetic circuit being in principle parallel or near parallel with the electrical machine rotor axis so that its two end are respectively bent downward to extend the magnetic circuits 5411, 5412 the rear ends forming the acting surfaces of the magnetic poles 5413, 5414 to face the coupling electrical machine rotor, and the pole surface of the magnetic pole having circular shape or similar shape concentric with the rotating shaft of the rotor for effectively coupling with the coupled rotor acting surface so that the above said downwardly bent magnetic poles are respectively provided with the positions A2 and A3 for installing the excitation devices.

Figure 56:
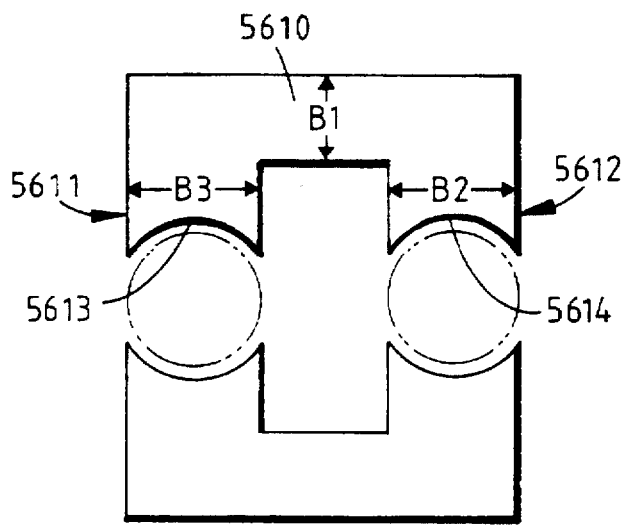
FIG. 56 is a plan view of a preferred embodiment of the invention illustrating the field magnetic circuit and excitation structure of the embodiments shown in FIG. 28-33.
Figure 57:
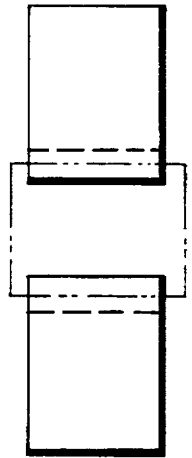
FIG. 57 is the side view of FIG. 56.

FIGS. 56 and 57 show a co-axial magnetic circuit type compound rotor electrical machine including the field magnetic circuit and excitation structure of the embodiments shown in FIGS. 28–33, and in which the magnetic poles structure including magnetic circuit section 5610, circuits 5611 5612, and positions B1, B2 and B3 respectively corresponding to circuit section 5410, circuits 5411 and 5412, and positions A1, A2, and A3 described above.

Figure 58:
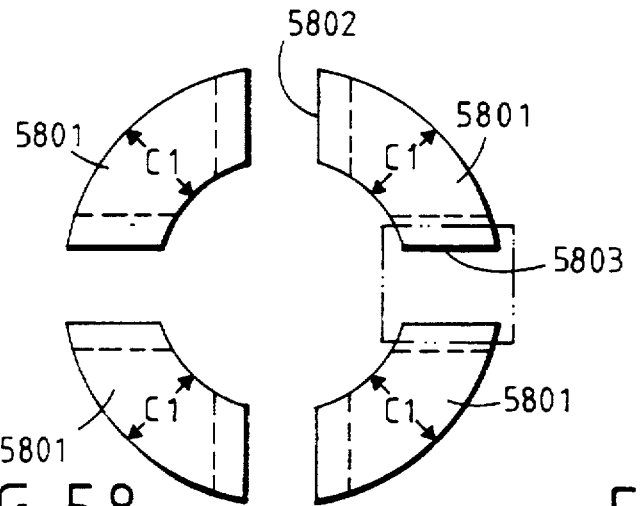
FIG. 58 is a plan view of a preferred embodiment of the invention illustrating the field magnetic circuit and excitation structure of the embodiments shown in FIGS. 19-27.
Figure 59:
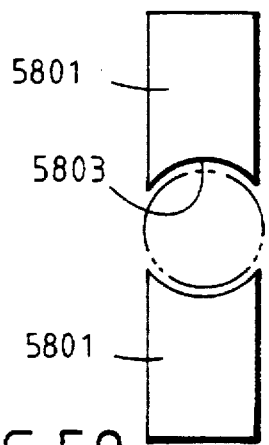
FIG. 59 is the side view of FIG. 58.

As shown in FIGS. 58 and 59, a co-axial magnetic circuit type compound rotor electrical machine includes the field magnetic circuit and excitation structure of the embodiments of FIGS. 19-27, and in which the magnetic pole and circuit iron cores and the rotor iron cores in general appear in a closed circular shape or other closed geometric shape structure. The multiple double-ended sections of magnetic circuits iron cores 5801 include magnetic pole surfaces, and are each provided with a middle section at a C1 position for installing the excitation device, the extending direction of the magnetic circuits being principle is at the same plane as the electrical machine rotor axis, and the magnetic circuit being series combined with the rotor iron cores so as to together form a close magnetic circuit, the magnetic pole surfaces 5802, 5803 coupled with the rotors having circular shapes or other similar shapes concentric with the rotating shaft of the rotor for effectively coupling with the coupled rotor acting surface.

Figure 60:
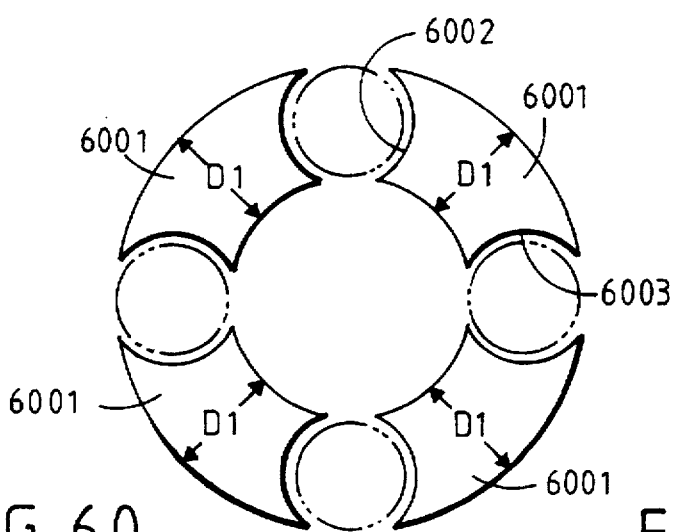
FIG. 60 is a plan view of a preferred embodiment of the invention illustrating the field magnetic circuit and excitation structure of the embodiments shown in FIGS. 34-53.
Figure 61:
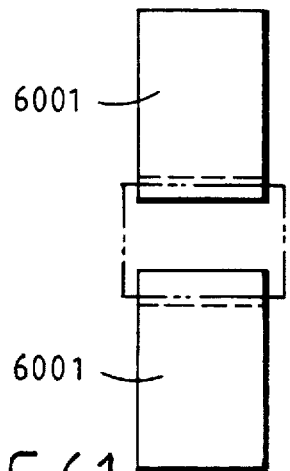
FIG. 61 is the side view of FIG. 60.

FIGS. 60 and 61 show a co-axial magnetic circuit type compound rotor electrical machine including the field magnetic circuit and excitation structure of the embodiments shown in FIGS. 34-53, and in which cores 6001, pole surfaces 5802 and 5803 and section D1 correspond respectively to cores 5801, surfaces 5802 and 5803, and middle section C1 described above.

Figure 62:
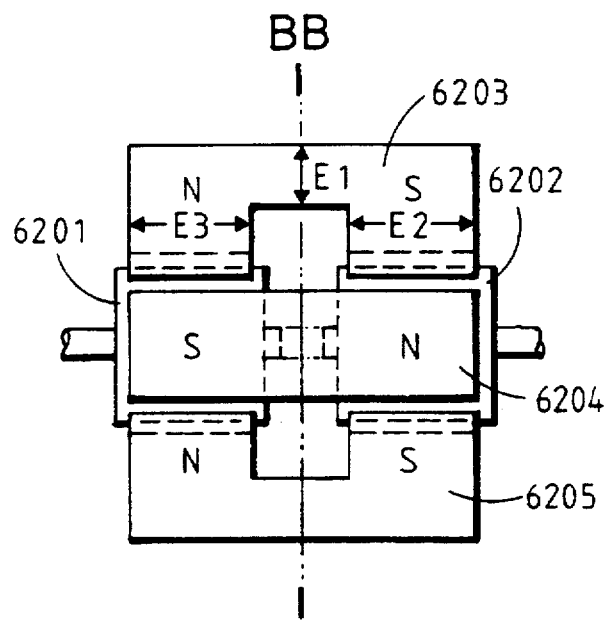
FIG. 62 is a plan view showing multi-pole iron cores for use in the series combined axis structure of the invention.
Figure 63:
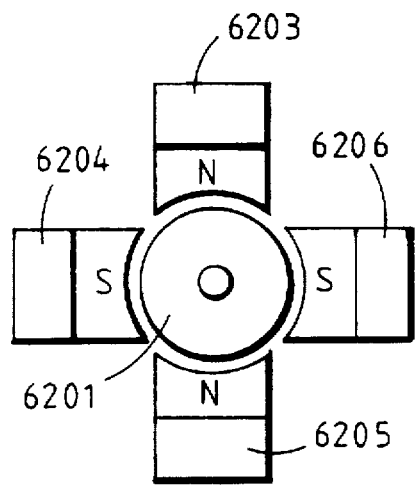
FIG. 63 is the BB-BB' sectional view of FIG. 62.

FIGS. 62 and 63 show an ex ample in which multi-pole iron cores are used in the series combined axis structure of the preferred co-axial magnetic circuit type compound rotor electrical machines, and in particular a four pole electrical machine constituted by a common field magnetic circuit iron core extending in the axial direction, and the two common axes including series installed rotors.

In the example of FIGS. 62 and 63, the bearings, windings, cooling fins, and casing are made of poorly conductive magnetic material and the components such as commutators, brushes, brush holders, brush springs, etc. for embodiments involving a DC electrical machine structure are installed at the relevant locations based on electrical machine operations, the embodying relationships between the magnetic circuit and the rotor being mainly comprised of the following:

The field magnetic circuit iron cores 6203–6206 can be made up of field magnetic circuits in separated forms or in one body, and in the case of DC electrical machine, made of good conductive magnetic material, and in the case of an AC electrical machine, made of conductive magnetic material with low eddy current loss and low iron loss, the four field magnetic iron cores 6203–6206 being arranged to provide 90° electrical angle direction, installed in the axial direction, and coupled with the rotor acting surfaces of the two electrical machines, with no magnetic circuit structure to connect between the field magnetic poles in individual electrical machines, the field magnetic circuit cores respectively coupled with the two sides of the rotor having different polarities, and the neighboring magnetic poles coupled with the same rotor also having different polarities, the excitation devices for the above said magnetic poles being installed at positions E1, E2, E3 as shown in the figure;

The electrical machine rotors 6201, 6202 are comprised of the rotors of DC or AC motors or generators, whereof the rotor rotating shaft can be series combined or separated for independent driving, and the series combination methods include use of a simple body at the same axis or connection by junctions made of conductive or non-conductive magnetic material.

Although a four magnetic pole embodiment is described above, other enlarged multiple poles structures can be applied in the same way.

Figure 64:
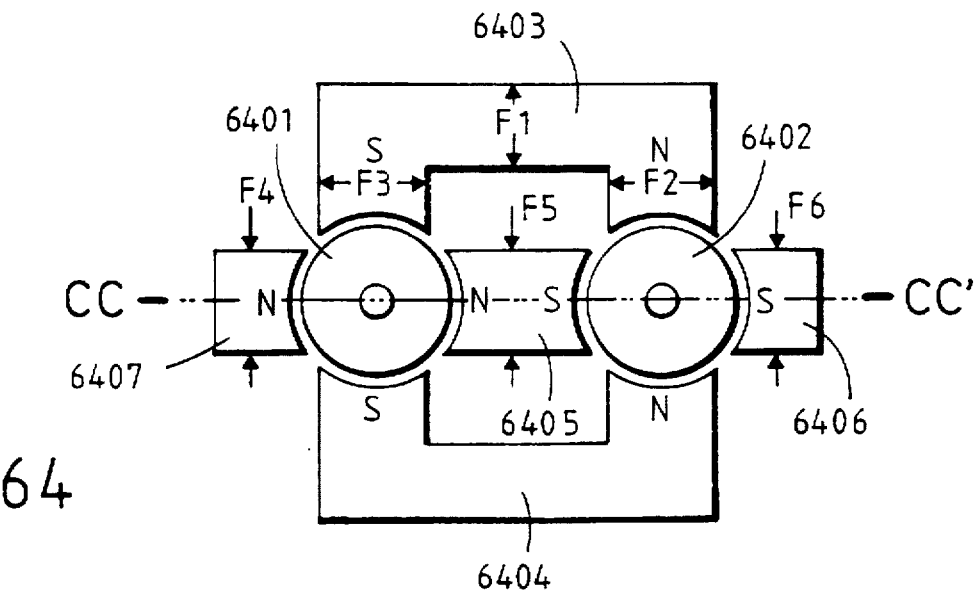
FIG. 64 is a plan view showing a further example of multi-pole iron cores for use in the series combined axis structure of the invention.
Figure 65:
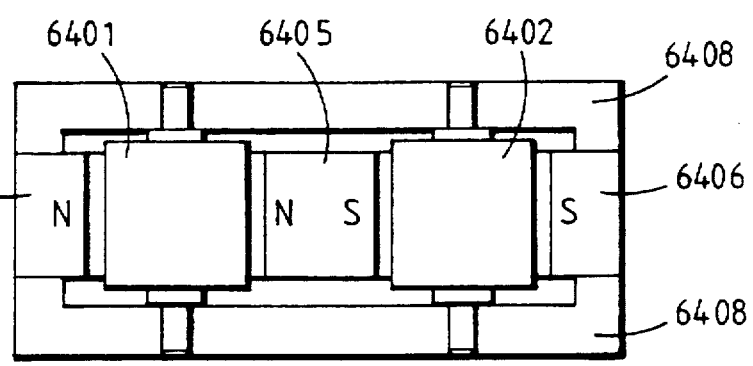
FIG. 65 is the CC-CC' sectional view of FIG. 64.

FIGS. 64 and 65 show multi-pole iron cores in a series combined axis structure of a co-axial magnetic circuit type compound rotor electrical machine, again including poles electrical machines constituted by a cross installed perpendicular and horizontal field magnetic circuit iron core structure coupled with at least two rotors with parallel axes.

In this embodiment of FIGS. 64 and 65, the bearings, windings, cooling fins, and casing are made of poorly conductive magnetic material and the components such as the commutators, brushes, brush holders, brush springs, etc. for embodiments involving a DC electrical machine structure are installed at appropriate locations as required by electrical machine operations, the relationships between the magnetic circuit and the rotor being mainly comprised of the following:

The perpendicular field magnetic circuit iron cores 6403, 6404 include field magnetic circuit iron cores perpendicularly coupled with the two rotor axis, wherein the field magnetic iron cores 6403 is coupled with the rotors 6401, 6402 at the same sides and its two end pole surfaces have different polarities and wherein the core 6404 is coupled with the two rotors at the other sides, and its two end pole surfaces have different polarities, the two field iron cores having the same polarity for the same rotor while their pole axes have a 180° mechanical angle difference;

The horizontal field magnetic circuit iron cores 6405–6407 are constituted by field magnetic circuit iron cores horizontally cross series combined with the rotor iron cores, and arranged in order from the exterior as follows: magnetic pole 6407→rotor 6401→magnetic pole 6405→6402→magnetic pole 6406 and the magnetic circuit iron core 6408 are installed horizontally at one side or both sides of the magnetic poles 6406 and 6407 to constitute a complete magnetic circuit, and the coupled acting surfaces of the magnetic poles 6405–6407 have the same polarity for the same rotor, except that the polarity is different from one of the perpendicularly coupled magnetic poles;

The excitation devices for the above described perpendicular and horizontal magnetic poles can be installed at positions F1–F6;

The rotating shaft of each of electrical machine rotors 6401 and 6402 are independently installed and arranged in parallel to drive the load individually or together.

Although FIGS. 64 and 65 show four magnetic poles as described above, it will be appreciated that other enlarged multiple pole structures can be derived in the same way.

The positions for installing the excitation devices as described in the above FIGS. 54–65 can be practically selected in actual applications as follows:

One or more than one of the positions can be selected to be excited by the winding excitation or by permanent magnets or a mixture of both;

The devices can be constituted by combining with magnetic circuits in separated forms or in one body, wherein for the case of a DC electrical machine, the circuits are made of good conductive magnetic material, and for the case of an AC electrical machine, the circuits are made of conductive magnetic material with low eddy current loss and low iron loss;

For applications in AC motors, the above said pole surface facing the rotor can be made into a "T" shape tooth and winding slot in parallel with or slanted to the rotor rotating shaft for accommodating windings.

As summarized from the above descriptions, the preferred co-axial magnetic circuit type compound rotor electrical machines can be widely applied in motors, generators or mixed types of machines, for an extensive variety of applications, while offering numerous advantages.

I claim:

1. A compound electrical machine comprising:

a plurality of individual electrical machines each having a rotor, said rotors respectively providing one of a mechanical power input and a mechanical power output for said individual electrical machines, and means responsive to changes in said one of said mechanical power input and said mechanical power output, or to changes in an excitation field of one of said individual electrical machines, for causing a relative mutual reaction to said changes, wherein at least two of said electrical machines include respective pairs of magnetic poles magnetically unconnected to each other except by means of a single closed magnetic flux path which passes through respective rotors of said at least two electrical machines and between neighboring poles of opposite polarity on different ones of said electrical machines such that flux flows between said neighboring magnetic poles of different polarity and in series through said rotors along said single closed flux path.

2. A compound electrical machine as claimed in claim 1, wherein the individual electrical machines are motors.

3. A compound electrical machine as claimed in claim 1, wherein the individual electrical machines are generators.

4. A compound electrical machine as claimed in claim 1, wherein the individual electrical machines include both generators and motors.

5. A compound electrical machine as claimed in claim 1, wherein the magnetic poles are permanent magnetic type magnetic poles.

6. A compound electrical machine as claimed in claim 1, wherein the magnetic poles are winding excitation type magnetic poles.

7. A compound electrical machine as claimed in claim 1, wherein the magnetic poles include both permanent magnet and winding excitation type magnetic poles.

8. A compound electrical machine as claimed in claim 1, wherein the individual electrical machines are of the same type.

9. A compound electrical machine as claimed in claim 1, wherein the individual electrical machines include different types of electrical machines.

10. A compound electrical machine as claimed in claim 1, wherein the individual electrical machines are operated independently to drive separate loads.

11. A compound electrical machine as claimed in claim 1, wherein the individual electrical machines are operated together to drive a common load.

12. A compound electrical machine as claimed in claim 1, wherein each rotor has a separate, independent rotating shaft.

13. A compound electrical machine as claimed in claim 12, wherein said shafts are coaxial.

14. A compound electrical machine as claimed in claim 12, wherein said shafts are parallel.

15. A compound electrical machine as claimed in claim 12, wherein said shafts include both coaxial and parallel shafts.

16. A compound electrical machine as claimed in claim 12, wherein said shaft have different angular orientations.

17. A compound electrical machine as claimed in claim 1, wherein said rotors have a common shaft.

18. A compound electrical machine as claimed in claim 1, wherein some of said rotors have a common shaft and some of said rotors have independent shafts.

19. A compound electrical machine as claimed in claim 1, wherein said rotors have different geometrical configurations.

20. A compound electrical machine as claimed in claim 1, wherein said electrical machines have separate rotor bearings, windings, and casings made of materials which have poor magnetic conductivity.

21. A compound electrical machine as claimed in claim 1, wherein said magnetic poles include iron field cores mutually connected by a magnetically conductive material.

22. A compound electrical machine as claimed in claim 21, wherein magnetic poles of an individual electrical machine are arranged so as to be 180° out of phase but are magnetically unconnected to each other except via said single flux path through rotors of other electrical machines.

23. A compound electrical machine as claimed in claim 21, wherein magnetic poles of an individual electrical machine are arranged to be 120° out of phase magnetically, and are connected by a ring of non-magnetically conductive material.

24. A compound electrical machine as claimed in claim 22, wherein said magnetic poles of an individual electrical machine have a common excitation winding.

25. A compound electrical machine as claimed in claim 1, wherein the rotors are oriented perpendicularly to each other.

26. A compound electrical machine as claimed in claim 1, wherein the magnetic poles are cross series combined and the rotors have perpendicular rotation axes.

27. A compound electrical machine as claimed in claim 1, wherein the rotors are connected to drive pinions or friction wheels individually driven by the rotors to drive a common gear or friction wheel.

* * * * *